HALL VOLTAGE GENERATORS FOR AMPLIFIER AND OSCILLATOR PURPOSES

Filed March 26, 1958

United States Patent Office 2,988,707

Patented June 13, 1961

2,988,707

HALL VOLTAGE GENERATORS FOR AMPLIFIER AND OSCILLATOR PURPOSES

Friedrich Kuhrt and Karl Maaz, Nurnberg, Germany, assignors to Siemens-Schuckertwerke Aktiengesellschaft, Berlin-Siemensstadt, Germany, a German corporation Filed Mar. 26, 1958, Ser. No. 724,177

Claims priority, application Germany Mar. 29, 1957

26 Claims. (Cl. 331—107)

Our invention relates generally to Hall-voltage generating devices, briefly called "Hall generators." Such devices comprise a magnetic field structure in whose field gap an electrically resistive Hall plate, such as a plate of semiconducting material, is disposed and, when in operation, is traversed by an electric current supplied from an extraneous source and flowing through the plate in a direction transverse to that of the magnetic field. Two electrodes on the plate, the so-called "Hall electrodes," are spaced from each other in a direction transverse to the current-flow direction and also transverse to the magnet-field direction and provide between each other a voltage, called "Hall voltage," which is zero when either the current or the magnetic field is zero and which otherwise has a finite value depending upon the field intensity and also upon the current intensity and being generally proportional to the mathematical product of both.

There has been known, long since, a proposal to use such a Hall generator for amplification, conversion of alternating currents, or generation of electric oscillations. This proposal was predicated upon the concept that the magnetic field was to be controlled by a current-traversed coil which was to furnish the magnetic field excitation for the production of the Hall voltage. The same proposal also contemplated having the field-producing coil excited by the generated Hall voltage for enabling the device to operate as an oscillation generator.

It has been found, however, that such a device was not utilizable technologically because the output magnitude of the device, presumably applicable as an amplifier, was smaller than the input magnitude. Hence the proposed device, in fact, had neither the capability of amplifying nor could it be used as an oscillation generator since both purposes require obtaining at the Hall electrodes a power output larger than the power needed for exciting the magnetic field. Furthermore the magnetic-field responsive resistance materials known at that time furnished Hall voltages that could not be subjected to a current consuming load but broke down when so loaded.

For some time past it has also become known that certain semiconducting compounds, having a charge-carrier mobility of more than 6000 cm.²/volt second, possess an electric resistance that is also responsive to changes in the strength of a magnetic field to which the compound is subjected. Among those semiconducting compounds are those of the type $A_{III}B_V$, namely compounds of an element from the third group with an element of the fifth group of the periodic system. Notable among such $A_{III}B_V$ compounds are, for instance, indium antimonide (InSb) and indium arsenide (InAs).

In principle, the use of such materials in Hall-voltage devices of the above-mentioned type would be a step toward solving the problem of producing an amplifier or oscillation generator. However, for obtaining useful amplification with the aid of such a semiconductor by utilizing the Hall effect, it is not sufficient to have the generated output reach a magnitude equal to that of the controlling power input. That is, for useful amplification the ratio of power output to power input must be considerably greater than the value 1. This is particularly necessary if such an amplifying device is provided with a feedback coupling to operate as an oscillation generator. For technological utility of such a device it would hardly suffice if the Hall generator were barely capable of providing for self-excitation and hence would just commence to oscillate without being capable of furnishing oscillatory power to the outside. Indeed, for practically applicable results, an amplification factor several times larger than unity should be attained if an appreciable and useful amount of power output is to be available.

It is an object of our invention to solve and amply satisfy the above indicated problem.

To this end, and in accordance with a feature of our invention, we use for the production of the magnetic field not only, as in the above-mentioned older proposal, an electrically excited magnet coil, but we provide a closed magnetic iron circuit which is excited by the controlling electric currents to be amplified. Such closed circuits, having one or more narrow field gaps for accommodating the Hall plate or plates, are known as such for use in Hall voltage generating devices. However, according to another requirement of our invention, the material forming the semiconductor Hall plate, on the one hand, and the width of the field gap provided in the closed magnetic system for receiving the semiconducting Hall plate, on the other hand, are so adapted to each other that the quotient ($\mu/\delta$) of the carrier mobility $\mu$ (cm.²/volt second) of the semiconducting material and the gap width $\delta$ (cm.) is larger than $10^6$ (cm./volt second).

It has been found that the efficacy of a Hall generator increases with decreasing width of the field gap, i.e. with decreasing thickness of the magnetic-field responsive resistance body that fills the gap of the magnet system. The permissible gap width is related to the carrier mobility of the magnetic-field responsive resistance body, so that when using semiconducting materials of high carrier mobility the gap can be made wider than when using semiconductor material of lower carrier mobility. Now, if according to our invention, the quotient of carrier mobility to gap width is made larger than $10^6$ (cm./volt second), particularly a great multiple thereof, then a practically useful power amplification and oscillation generation based upon the Hall effect is reliably afforded.

We have found, by calculation and tests, that an appreciable increase in sensitivity of a Hall device can be attained only if the coefficient $$\mu_0 \cdot \frac{R_h \cdot w \cdot i_s}{(R_{ih} R_w) \cdot d \cdot \delta}$$

is approximately equal to unity. In this formula, $\mu_0$ denotes the magnetic permeability of air in volt/second ampere centimeter, $R_h$ denotes the Hall coefficient in cm.³/ampere second, $w$ is the number of turns of the winding that excites the magnetic field, $i_s$ is the control current in amps. flowing through the Hall plate, $R_{ih}$ is the interior resistance of the Hall plate in ohms, $R_w$ is the resistance connected to the Hall electrodes in ohms, $d$ is the thickness of the Hall plate in cm., and $\delta$ is the width of the air gap in cm. The inner resistance of the semiconductor $R_{ih}$ is proportional to $1/\sigma \cdot d$, wherein $\sigma$ denotes the conductivity. Consequently, considering the resistance-matching condition $R_{ih}=R_w$, one obtains from the foregoing formula:

$$\frac{\mu_0 \cdot w \cdot i_s R_h \cdot \sigma}{2\delta}$$

The term $\sigma \cdot R_h$ is proportional to the carrier mobility $\mu$.

Consequently, neglecting proportionality factors, the formula can be written as:

$$\frac{\mu_0 \cdot w \cdot i_s}{2} \cdot \frac{\mu}{\delta}$$

While the first portion of this formula does not play an important part relative to the result, it will readily be observed that, with respect to amplifying properties, the quotient $$\frac{\mu}{\delta}$$

is almost exclusively significant; and it is this quotient which, according to our invention, is to have a larger numerical value than $10^6$ for the purpose of providing useful amplification or oscillation generation.

A Hall amplifier according to the invention can be used as voltage amplifier in various designs, irrespective of the type of the magnetic-field responsive resistance material and for the Hall plate. When using materials of high carrier mobility, namely semiconducting compounds whose mobility is more than 6000 cm.$^2$/volt second, the Hall voltage can be subjected to a current load so that the Hall amplifier according to the invention is also suitable as a current amplifier and, particularly, also as a power amplifier. If a winding used for producing the magnetic field is excited by the Hall voltage, such a power amplifier is also applicable as an oscillation generator. By virtue of its low-ohmic output and low-ohmic input stages, such a Hall amplifier produces only slight resistance noise. For obtaining rectifying effects, provision may be made for pre-magnetization of the iron circuit, or a ferromagnetic material of approximately rectangular magnetizing characteristic may be used for building up the magnetic circuit. Such ferromagnetic materials are available in the trade, for instance under the trade name "Permenorm 5000 Z."

The invention will be further explained with reference to the drawing showing, by way of example, several embodiments of devices according to the invention.

FIG. 1 illustrates schematically and in perspective a Hall generating device as actually used in practice.

FIG. 1*a* is a separate showing of the circuit connections to the Hall plate of the same device.

FIG. 2 shows schematically a modification of a Hall generator together with an example of circuitry for amplifying purposes.

Figures 1, 1A:
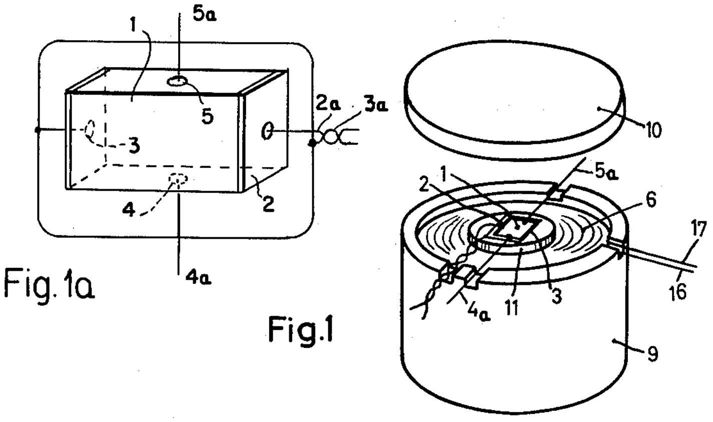

The Hall generator illustrated in FIG. 1 is provided with a magnetic system 9 designed as a cup-shaped magnet which provides for good shielding against extraneous magnetic fields. The cup-shaped structure 9 has a center limb 11 which carries the electric excitation winding 6 with terminal leads 16 and 17. The magnetic circuit of the system is closed through a cover 10 shown in lifted-off position. The width of the field gap between limb 11 and cover 10 in which the Hall plate 1 is located, is rated in accordance with the invention as explained above and hence is dimensioned in proper relation to the carrier mobility of the semiconductor material of which the Hall plate 1 is made. The Hall plate 1 is fastened to the upper end of the center limb 11 and is provided with current supply terminals 2 and 3 to which respective current supply leads **2*a* and 3*a*** are attached, as is more clearly apparent from the diagram shown in FIG. 1*a*. The Hall plate is further provided with Hall electrodes 4 and 5 to which respective Hall-voltage leads **4*a* and 5*a* are attached. The leads 2*a* and 3*a*** are arranged in an induction-free manner and are twisted together as is apparent from FIG. 1*a*. It should be understood that the particular circuit connection shown in FIG. 1*a* is not always needed and that other circuit connections may be used instead.

The cup-shaped magnet structure 9, if desired, may be made of mumetal sheets or tapes which are spirally wound from the inside toward the outside of the structure.

When the generator or amplifier of FIG. 2 is in operation, an auxiliary source S of direct or alternating voltage is connected to the current supply terminals 2 and 3 as is apparent from FIG. 2. For example, this passes through the Hall plate a constant current indicated in FIG. 2 by $i_s$.

In a generator design according to the invention and as shown in FIG. 1, made and used in practice, the Hall plate 1 consisted of indium arsenide (InAs) having a carrier mobility of approximately $\mu$=23,000 cm.$^2$/volt second. The Hall plate had the following dimensions:

| | | |
|---|---|---|
| Length | mm | 6 |
| Width | mm | 3 |
| Thickness | microns | 20 |

The field-gap width $\delta$, being substantially identical with the thickness of the Hall plate, therefore was approximately 20 microns, so that the above-mentioned ratio of $\mu/\delta$ was approximately $11.5 \times 10^6$. The maximum induction of the magnetic system was 3000 gauss. The control current $i_s$ furnished by the auxiliary voltage source S was 400 milliamps. With this device, an amplification factor of about 10 was obtained.

When good shielding from extraneous magnetic fields is not important, the magnet may also be formed as an E-shaped core, for example as schematically illustrated in FIG. 2, where, of course, the air gap is shown exaggerated and the Hall plate, for the purpose of illustration, is turned 90° from its actual position. The device shown in FIG. 2 is essentially a direct-current amplifier. In this illustration, as well as in all following embodiments, the same reference characters are used in FIGS. 1 and 1*a* for corresponding components respectively. The resistance body 1 in FIG. 2 has the shape of a thin plate and consists of indium arsenide. Supplied to the current terminals 2 and 3 is an auxiliary current, denoted by $i_s$, which is furnished through a rheostat R from a source S and may be either direct current or alternating current of constant amplitude. Connected to the control winding 6 of the magnetic field system **9*a* is the input signal to be amplified. The amplified signal is taken from across the Hall electrodes 4 and 5**.

If the auxiliary current from source S is alternating, then the direct-current input signal is simultaneously converted into an alternating-current output. The device is thus also applicable for modulating purposes.

Figure 3:
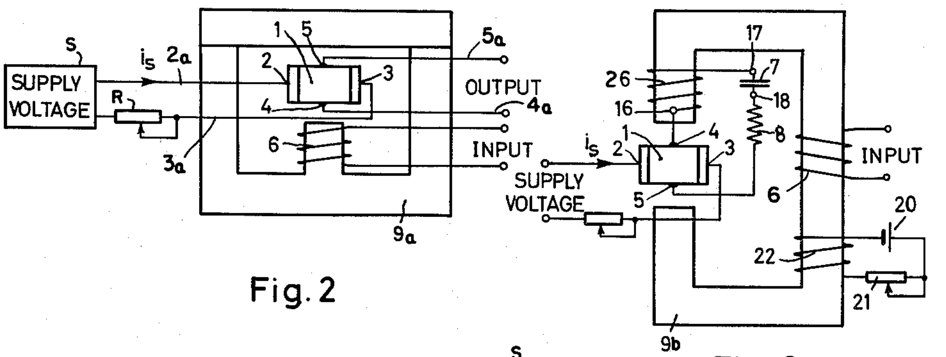
FIG. 3 is a schematic and simplified showing of another Hall generator according to the invention with circuitry for the purpose of generating oscillations.

In the oscillation generator according to FIG. 3, the semiconducting Hall plate 1 is traversed by a constant control current $i_s$ passing through the terminals 2 and 3. The Hall electrodes 4 and 5 are connected through a capacitor 7 with a feedback winding 26 of the magnet system **9*b*. The capacitance of the capacitor 7 and the inductivity of the winding 26 determine the frequency of the oscillations being generated. In this manner, a self-excited Hall generator is obtained. The generated oscillations can be taken off either across a series resistor 8 between the terminal points 5 and 18, or across the capacitor 7 between terminals 17 and 18, or also from across the winding 26 between terminals 16 and 17. Instead of the resistor 8**, a transformer or other coupling member may be provided for the purpose of taking the oscillatory power off the generator.

For obtaining a rectifying effect, the magnetic system may be provided wtih means for pre-magnetizing the iron circuit. For this purpose, and as shown in FIG. 3, the magnetic system *9b* may be provided with an additional excitation winding 22 which is energized from a battery 20 or other constant-voltage source through an adjusting rheostat 21. Instead of such pre-magnetization, the magnetic system *9b* may be made of a ferromagnetic material having an approximately rectangular magnetization loop characteristic. As mentioned, such materials are available in the trade, for example under the trade name "Permenorm 5000 Z."

In Hall generating devices according to the invention a single magnetic field gap may contain a plurality of Hall plates which are either traversed by one and the same control current or are connected to separate current sources. In this case the two or more Hall plates may be connected either in series or in parallel. It is further within the scope of our invention to provide a single magnetic circuit with more than one air gap and to provide a Hall plate in each of these gaps. In this case, if desired, several oscillations of different frequency may be produced simultaneously by tuning the feedback circuits of the individual Hall plates to respectively different frequency values. Such modifications are exemplified by the embodiments shown in FIGS. 4 and 5 and described presently.

Figure 4:
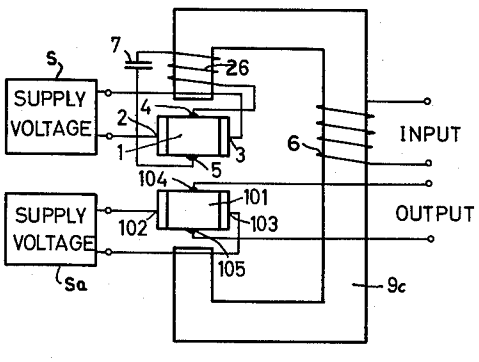
FIG. 4 shows schematically another modification of a Hall generator which comprises two Hall plates within a single gap.

According to FIG. 4, in which, for illustration, a single air gap is shown enlarged and the Hall plates are turned from their actual position as explained above with reference to FIG. 2, two Hall plates 1 and 101 are located one above the other in the same field gap of the magnet system *9c*. The Hall plate 1 is designed and connected as described above with reference to FIG. 3. The Hall plate 101 is substantially identical with the Hall plate 1 and comprises current supply terminals 102, 103 and Hall electrodes 104, 105. The current terminals 2, 3 of Hall plate 1 are connected to a source S of constant voltage. The current electrodes 102, 103 of Hall plate 101 are connected to a separated current source S*a* also of constant voltage which need not have the same magnitude as the voltage from source S. In this device, the Hall plate 1 serves for generating an oscillation of a desired frequency, whereas the Hall plate 101 serves to produce output voltage.

Figure 5:
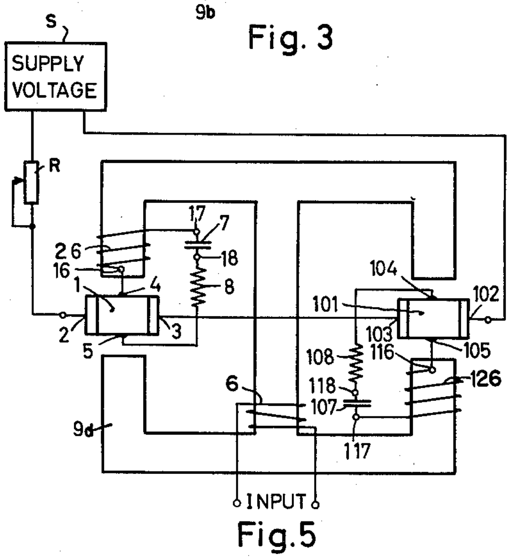
FIG. 5 illustrates a further modification of a Hall generator with two Hall plates located in two field gaps respectively.

In the embodiment shown in FIG. 5, the two Hall plates 1 and 101, individually designed as described with referenec to the respective Hall plates in FIG. 4, are connected in series with each other to a source of supply voltage S through a calibrating rheostat R. The magnetic system *9d* is provided with two air gaps in which the respective Hall plates are located. The Hall electrodes 4, 5 of Hall plate 1 form part of an oscillatory circuit designed and operative in the same manner as the one described with reference to FIG. 3. The Hall electrodes 104, 105 of Hall plate 101 are connected in series with a resistor or transformer 108 and in series with a capacitor 117 to the feedback winding 126. The generated oscillations are available across the terminals 117, 116 or across terminals 117, 118, or across the member 108. The feedback circuit of the two Hall generators, thus combined into a single device, may be tuned to respectively different frequencies.

In the embodiment of FIG. 5, there are two separate magnetic circuits, whose flux passes through the common center limb. Therefore, the following formulation applies:

$$\frac{\text{Mobility } A}{\text{Gap width } W} > 10^6 \text{ cm./volt second} < \frac{\text{mobility } A'}{\text{gap width } W'}$$

Devices according to the invention also permit obtaining amplification and simultaneous generation of oscillations as well as a superposition of currents or voltages of respectively different wave shapes for the purpose of effecting modulation, demodulation or other translating actions.

It will be obvious to those skilled in the art, that our invention is not limited to the particular embodiment illustrated and described herein but can be modified in various respects and applied for other purposes without departing from the essential features of our invention and within the scope of the claims annexed hereto.

We claim:

1. An amplifying device, comprising a magnetic field system forming a ferromagnetic circuit having a field gap, a Hall plate disposed in said gap and having current supply terminals defining a current axis transverse to the field in said gap, said Hall plate having Hall electrodes mutually spaced in a direction transverse to said field and transverse to said axis, said Hall plate consisting of a semiconducting compound of a carrier mobility above 6000 cm.$^2$/volt second, and the width of said gap in centimeters being adapted to said carrier mobility to form a mobility-to-width quotient greater than $10^6$ cm./volt second.

2. A direct current amplifying device having an amplification factor several times greater than unity, comprising a magnetic field system forming a closed magnetic circuit and having a field gap, a Hall plate disposed in said gap and having current supply terminals defining a current axis transverse to the field in said gap, a source of direct voltage connected to said current supply terminals, said Hall plate having Hall electrodes mutually spaced in a direction transverse to said field and transverse to said axis, said Hall plate consisting of a semiconducting, crystalline indium arsenide having a carrier mobility above 6000 cm.$^2$/volt second, and the width of said gap in centimeters being adapted to said carrier mobility to form a mobility-to-width quotient which is a multiple of $10^6$ cm./volt second.

3. An amplifying device according to claim 1, comprising pre-magnetizing means of normally constant magneto-motive force connected with said field system.

4. In an amplifying device according to claim 1, said magnetic field system consisting of a ferromagnetic material having a substantially rectangular magnetization characteristic.

5. An amplifying device, comprising a magnetic field system forming a ferromagnetic circuit having a field gap, a plurality of Hall plates disposed in said gap, each of said plates having two current supply terminals defining a current axis transverse to the field in said gap and having Hall electrodes mutually spaced in a direction transverse to said field and transverse to said axis, each of said plates consisting of a semiconducting compound having a carrier mobility above 6000 cm.$^2$/volt second, and the width of said gap in centimeters being adapted to said carrier mobility to form a mobility-to-width quotient greater than $10^6$ cm./volt second.

6. A Hall device according to claim 5, comprising a source of current to which said terminals of said plurality of Hall plates are connected so that all of said plates are traversed by the same current.

7. A Hall device according to claim 5, comprising a plurality of current supply means connected to said terminals of said respective Hall plates whereby said plates are energized by separate currents respectively.

8. A Hall device according to claim 5, comprising current supply means connected to said terminals of said Hall plates, said Hall plates being connected in parallel relation to each other relative to said supply means.

9. An amplifying device having an amplification factor several times greater than unity, comprising a magnetic field system forming a magnetic iron circuit having a plurality of field gaps in magnetic series relation to each other, a plurality of Hall plates disposed in said respective gaps, each of said plates having two current supply terminals defining a current axis transverse to the field in said gap and having Hall electrodes mutually spaced in a direction transverse to said field and transverse to said axis, each of said plates consisting of a semiconducting compound having a carrier mobility above 6000 cm.$^2$/volt second, and the width of said gap in centimeters being adapted to said carrier mobility to form a mobility-to-width quotient which is a multiple of $10^6$ cm./volt second.

10. An oscillator, comprising a magnetic field system forming a closed magnetic circuit and having gap means, a plurality of Hall plates disposed in said gap means, each of said plates having two current supply terminals defining a current axis transverse to the field in said gap and having Hall electrodes mutually spaced in a direction transverse to said field and transverse to said axis, direct voltage supply means connected to said current supply terminals, each of said plates consisting of a semiconducting compound having a carrier mobility above 6000 cm.$^2$/volt second, and the width of said gap means in centimeters being adapted to said carrier mobility to form a mobility-to-width quotient greater than $10^6$ cm./volt second, and each of said Hall plates having an oscillatory feedback circuit connected to its Hall electrodes and inductively linked with said field system for generating oscillations.

11. In an oscillation generating device according to claim 10, each of said feedback circuits comprising an excitation coil on said field system for simultaneously producing a plurality of oscillations, and each of said feedback circuits having output means for supplying said respective oscillations.

12. In an oscillation generating device according to claim 11, said feedback circuits being tuned to respectively different oscillation frequencies.

13. An amplifying device according to claim 1, comprising an additional excitation winding on said magnetic field system for influencing the output of the device.

14. An amplifying device, comprising an electromagnetic field structure foming a magnetic iron circuit having a field gap, an excitation winding on said field structure for receiving an input signal, a Hall plate disposed in said gap and having current supply terminals defining a current axis transverse to the field in said gap, current supply means having induction-free leads connected to said terminals, said Hall plate having Hall electrodes for supplying an output voltage, said electrodes being spaced from each other in a direction transverse to said field and transverse to said axis, said Hall plate consisting of a semiconducting compound of a carrier mobility above 6000 cm.$^2$/volt second, and the width of said gap in centimers being adapted to said carrier mobility to form a mobility-to-width quotient greater than $10^6$ cm./volt second.

15. An amplifiying device having an amplification factor several times greater than unity, comprising a magnetic field system forming a ferromagnetic circuit having a field gap, a Hall plate disposed in said gap and having current supply terminals defining a current axis transverse to the field in said gap, said Hall plate having Hall electrodes mutually spaced in a direction transverse to said field and transverse to said axis, said Hall plate consisting of a semiconducting, crystalline antimonide having a carrier mobility above 600 cm.$^2$/volt second, and the width of said gap in centimeters being adapted to said carrier mobility to form a mobility-to-width quotient which is a multiple of $10^6$ cm./volt second.

16. An amplifying device having an amplification factor several times greater than unity, comprising a magnetic field system forming a ferromagnetic circuit having a field gap, a Hall plate disposed in said gap and having current supply terminals defining a current axis transverse to the field in said gap, said Hall plate having Hall electrodes mutually spaced in a direction transverse to said field and transverse to said axis, said Hall plate consisting of a semiconducting, crystalline $A_{III}B_V$ compound having a carrier mobility above 6000 cm.$^2$/volt second, and the width of said gap in centimeters being adapted to said carrier mobility to form a mobility-to-width quotient which is a multiple of $10^6$ cm./volt second.

17. The device defined in claim 9, the semiconductor compound being indium arsenide of the formula InAs.

18. The device defined in claim 9, the semiconductor compound being indium antimonide of the formula InSb.

19. A device for converting a direct current source of power into oscillations, comprising a magnetic field system forming a ferromagnetic circuit which is closed except for at least one field gap, a Hall plate respectively disposed in each gap present, the respective Hall plate having current supply terminals defining a current axis transverse to the magnetic field in the respective gap, said current supply terminals having a direct voltage source connected thereto, said respective Hall plate having Hall electrodes mutually spaced in a direction transverse to said field and transverse to said axis, said respective Hall plate being formed of a semiconducting compound of a carrier mobility above 6000 cm.$^2$/volt second, and the width of the respective gap in centimeters being adapted to said carrier mobility to form a mobility-to-width quotient greater than $10^6$ cm./volt second, a magnetic field excitation winding on said field system, an oscillatory feedback circuit including said winding and connected to said Hall electrodes, to determine the frequency of the oscillations generated.

20. The device defined in claim 19, said feedback circuit including an inductance and capacitance in series with each other and the Hall electrodes.

21. The device defined in claim 19, and premagnetization means providing a non-oscillatory magneto-motive force of a magnitude sufficient to rectify said oscillations.

22. The device defined in claim 19, the respective Hall plate having a thickness substantially equal to the width of the respective gap.

23. A device for converting a direct current source of power into oscillations, comprising a magnetic field system forming a ferromagnetic circuit having a gap, a Hall plate disposed in said gap, the Hall plate having current supply terminals defining a current axis transverse to the magnetic field in the gap, said current supply terminals having a direct voltage source connected thereto, said Hall plate having Hall electrodes mutually spaced in a direction transverse to said field and transverse to said axis, said Hall plate being formed of a semiconducting compound of a carrier mobility above 6000 cm.$^2$/volt second and taken from the group consisting of indium arsenide and indium antimonide, and the width of the gap in centimeters being adapted to said carrier mobility to form a mobility-to-width quotient greater than $10^6$ cm./volt second, a magnetic field excitation winding on said field system, an oscillatory feedback circuit including said winding and connected to said Hall electrodes, to determine the frequency of the oscillations generated.

24. The device defined in claim 23, the ferromagnetic circuit being closed, the gap being closed by the Hall plate.

25. The device defined in claim 1, the said quotient being a multiple of $10^6$ cm./volt second, the thickness of the Hall plate being substantitally the same as the gap width.

26. The device defined in claim 23, the said quotient being a multiple of $10^6$ cm./volt second, the thickness of the Hall plate being substantially the same as the gap width.

References Cited in the file of this patent

UNITED STATES PATENTS

| | | |
|---|---|---|
| 2,736,822 | Dunlap | Feb. 28, 1956 |
| 2,774,890 | Semmelman | Dec. 18, 1956 |
| 2,814,015 | Kuhrt | Nov. 19, 1957 |
| 2,825,858 | Kuhrt | Mar. 4, 1958 |
| 2,852,732 | Weiss | Sept. 16, 1958 |

FOREIGN PATENTS

| | | |
|---|---|---|
| 1,112,433 | France | Nov. 16, 1955 |